Oct. 28, 1952 — R. A. BRODING — 2,615,956
BOREHOLE TELEMETERING
Filed Jan. 5, 1951 — 4 Sheets-Sheet 2

ROBERT A. BRODING
INVENTOR.

BY D. Carl Richards
AGENT

Patented Oct. 28, 1952

2,615,956

UNITED STATES PATENT OFFICE 2,615,956

BOREHOLE TELEMETERING

Robert A. Broding, Dallas, Tex., assignor, by mesne assignments, to Schlumberger Well Surveying Corporation, Houston, Tex., a corporation of Delaware Application January 5, 1951, Serial No. 204,676

4 Claims. (Cl. 175—182)

This invention relates to well logging and more particularly to the measurement of properties of the formations adjacent a well bore. In a more specific aspect the invention is directed to the elimination of the effect of variations in the impedance of a cable over which there is transmitted for measurement a signal from an associated detecting system in which such variations otherwise make more difficult the interpretation of the resulting log.

Well logging instruments for exploring formations along a bore hole are suspended on a cable which ordinarily is wound on and controlled by a power-driven reel for varying the length of the cable in the hole. In systems utilizing bridge networks at the end of such a cable, variations in the impedance of the cable when subject to temperature variations as it is lowered into the bore hole are reflected into the bridge network. In such alternating current bridges, the phase relation of the unbalance signal is controlled at least in part by the impedance of the cable independently of the formations adjacent thereto.

For example, in the patent application of applicant R. A. Broding, Serial No. 72,451, for an Electrical Logging System, now Patent No. 2,535,666, there is disclosed a Maxwell bridge which has associated therewith an elongated inductance. Upon excitation of the bridge network at a first diagonal, formations adjacent thereto are inductively coupled to the bridge, and an output signal is produced across the second diagonal of the bridge, the variations in which are dependent upon the characteristics of the formations. The unbalance signal is then transmitted to the earth's surface and is there divided into two components, the first of which is controlled by the conductivity of the formations, and the second of which is controlled by the magnetic susceptibility. This is accomplished by phase-detecting the unbalance signal. However, it has been found that the phase-detecting operation is complicated by reason of the fact that variations are introduced into the unbalance signal, as more or less of the suspended cable is in the bore hole, that are in no way related to a property of the formation.

In accordance with the present invention and in one form thereof, there is provided at the earth's surface a source of alternating current for exciting a bridge network positioned in the bore hole. A circuit is provided for interconnecting the source of alternating current and a first diagonal of the bridge network. The unbalance signal from the bridge network appearing across the second diagonal of the bridge network is frequency-modulated at a first frequency, and is transmitted by way of the cable to a phase-detecting system located at the earth's surface. Additionally, the signal applied to the first diagonal of the bridge network is frequency-modulated at a second frequency and is transmitted to the phase-detecting system at the surface by way of the cable. Demodulators interconnecting the circuit and the phase-detecting system produce a reference signal and a bridge unbalance signal that are independent variations in the impedance of the cable or the circuit means as the depth of the exploring a bridge is varied.

For a more complete understanding of the present invention and for further objects and advantages thereof, reference may now be had to the following description taken in conjunction with the accompanying drawings in which.

Figure 1:
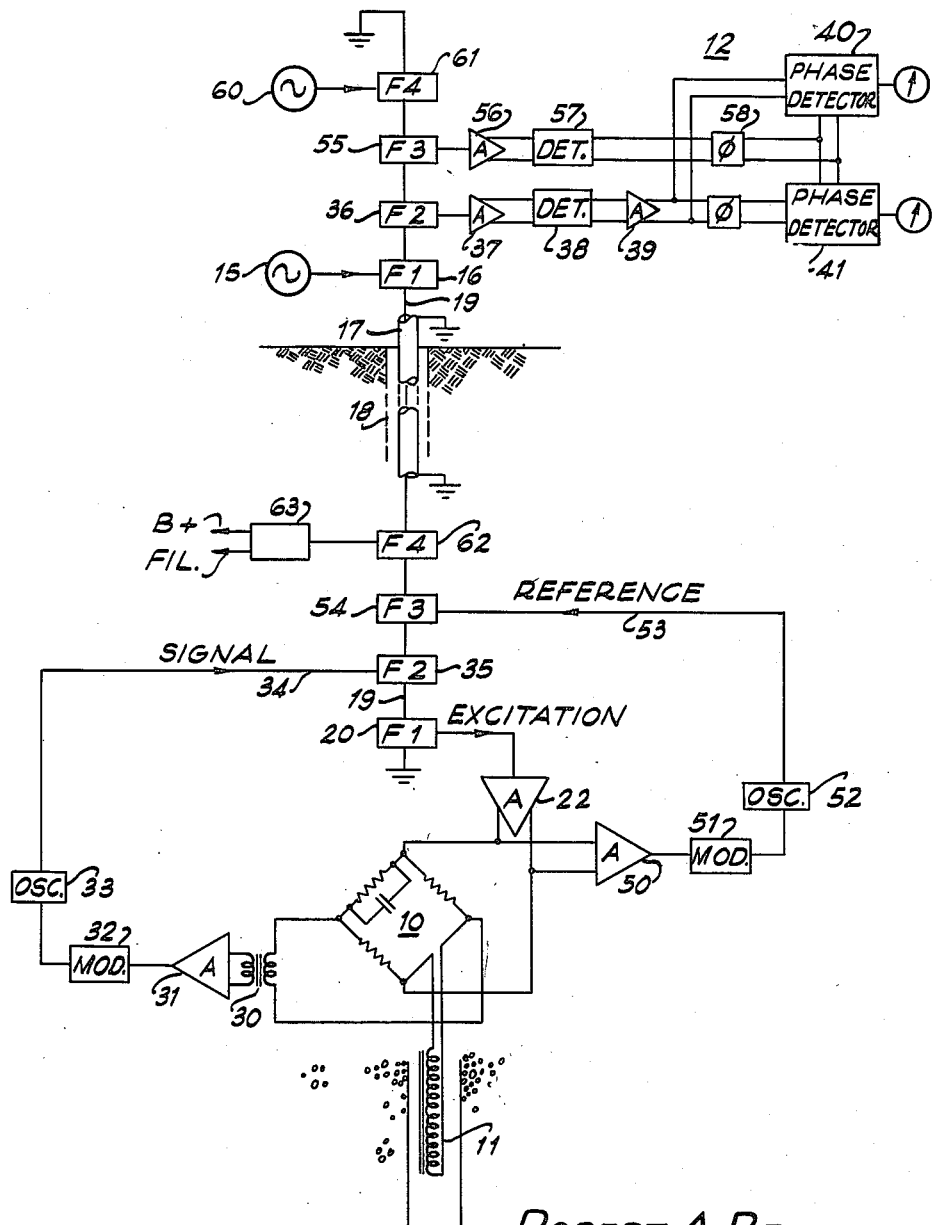
Fig. 1 is a block diagram of a system embodying the present invention.

Referring now to Fig. 1, there is illustrated a Maxwell bridge 10, the inductance arm of which is formed by an elongated solenoid 11. The bridge 10, excited with alternating current at the vertical diagonal, produces an unbalance signal that is detected at the horizontal diagonal and is transmitted uphole to a phase-detecting system 12. The unbalance signal as modified by the phase-detecting system is utilized to produce two output indications, the first being dependent upon variations in the conductivity of the formations adjacent the inductance 11, and the second being controlled by the susceptibility of the formations. The output signals from the phase-detector are obtained by comparing the unbalance signal from the bridge 10 with a reference signal. In prior art systems the signals thus produced have been characterized by a drift that is uniformly proportional to the depth of the instrument in the bore hole, the drift being due to the variations in the impedance of the cable associated with the bridge 10 which modify the phase relations between the unbalance signal and reference signal.

In order to overcome such difficulties in prior art systems and to provide a means for operating logging systems such as exemplified by the above identified Broding application in conjunction with a single conductor cable, applicant provides a frequency-modulation system shown partially in block diagram form in Fig. 1 wherein the unbalance signal from the bridge network and the reference signal for the phase-detector 12 are transmitted over the same path or over different paths having identically varying parameters so that the relative phase relation between the reference signal at the bridge network 10 and the unbalance signal as they appear at the surface are independent of bore hole depth.

More particularly, a source of alternating current 15 having a frequency, $F_1$, is connected by way of a filter 16 to a cable 17 extended from the earth's surface into a bore hole 18. As is well understood in the well logging art, the cable 17 is wound upon a power-driven reel (not shown) and the cable conductor 19 ordinarily is connected to surface measuring equipment by way of slip rings (not shown).

The alternating current signal $F_1$ is transmitted downhole to a filter 20 which is designed to present high impedance to the signal $F_1$. Filter 20 is coupled to an amplifier 22, the output of which is connected directly to the input or vertical diagonal of the bridge network 10. The horizontal diagonal of the bridge network 10 is connected by way of a transformer 30 and an amplifier 31 to a frequency-modulated system which includes a modulator 32 and an oscillator 33 having an output center frequency $F_2$. The output of the oscillator 33 thus deviates from the center frequency $F_2$ in dependence on the unbalance signal from the bridge network 10. The signal $F_2$ from oscillator 33 is applied by way of conductor 34 to a filter 35 which is connected in circuit with the conductor 19 of cable 17. The signal $F_2$ is transmitted at the surface from a filter 36 to an amplifier 37 and detector 38. The output of detector 38 is of frequency $F_1$ and is transmitted by way of an amplifier 39 to phase detectors 40 and 41.

In order to provide a reference signal for the phase detectors 40 and 41 having phase relations with respect to the bridge unbalance signal independent of variations in the impedance of cable 17 as it is lowered into the bore hole, circuit means are provided to assure the transmission of the reference signal over a path that is affected in the same manner and to the same extent as the path for the unbalance signal. More particularly, the exciting signal for the bridge network 10 as it appears at the input or vertical diagonal of the bridge 10 is applied to an amplifier 50 and modulator 51 to control the frequency of the output of the oscillator 52. The oscillator output, having a center frequency $F_3$, is transmitted by way of conductor 53 to a filter 54 connected in circuit with conductor 19 of the cable 17. The cable 17 forms a path for the transmission of the signals from the bridge network 10 to the phase detectors 40 and 41. A variable portion of this path has variable distributed electrical constants that vary as the depth of the network 10 is varied, i. e., as more of the cable is subject to bore hole temperature. The reference signal $F_3$ and the unbalance signal $F_2$ are demodulated at a point in the transmission path that electrically is on the side of the variable impedance portion of cable 17 opposite the bridge 10. Thus at the earth's surface the reference signal $F_3$ is transmitted from a filter 55 to an amplifier 56 and a detector 57, the output of which is at a frequency $F_1$. The output of detector 57 is then coupled by way of phase-shifting network 58 to the phase-detectors 40 and 41 and serves as a reference voltage for the detection of selected components of the unbalance signal from the bridge 10 as it appears at the output of the amplifier 39.

From the foregoing it will be seen that the unbalance signal from the bridge 10 and the exciting signal for the bridge 10 are both frequency-modulated and coupled to the cable 17 by way of the filters 35 and 54, respectively, and thus work into an impedance that undergoes variations of precisely the same character for both signals.

In addition to the foregoing and to facilitate operation of the exploring or "down hole" portion of the system of Fig. 1, a source of alternating current 60 of frequency $F_4$ is transmitted by way of filter 61, cable 17, and filter 62 to a conventional power supply rectifier system 63 to provide the requisite D. C. voltages.

Figure 2:
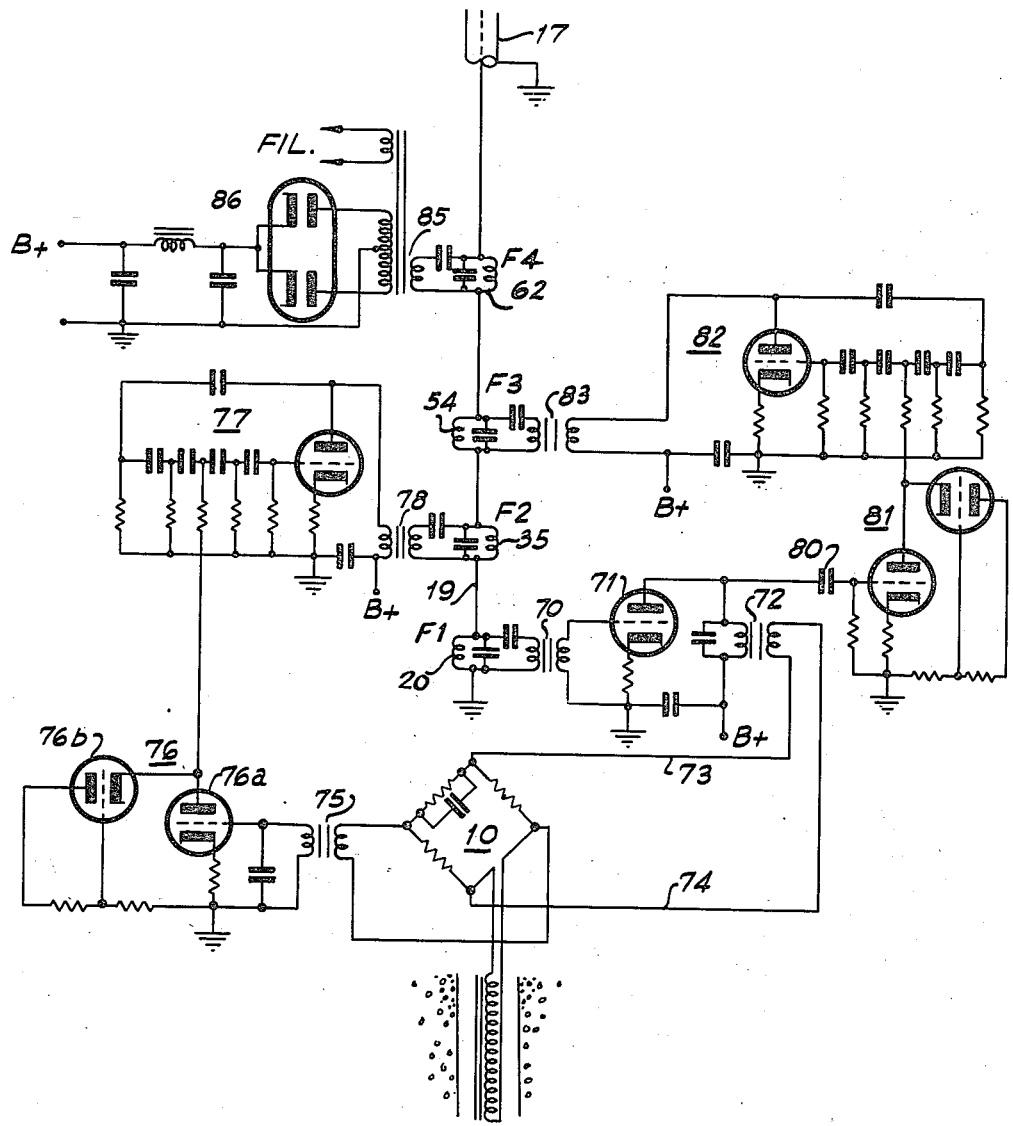
Fig. 2 is a schematic diagram of the bore hole portion of the system of Fig. 1.

Referring now to Fig. 2, there is illustrated a detailed circuit diagram of the portion of the system positioned in the bore hole. Where consistent, elements have been given the same reference characters as in Fig. 1.

The signal for exciting the bridge network 10 passes through an L.-C. filter 20, which forms a high impedance in the cable conductor 19 with respect to currents having frequency $F_1$. The output of the filter 20 developed across its high impedance is applied by way of a transformer 70 to a triode amplifier 71. The output of the amplifier 71 is coupled by way of transformer 72 and conductors 73 and 74 to the vertical diagonal of the bridge network 10. Any unbalance signal appearing across the horizontal diagonal of the bridge network 10 is applied by way of a transformer 75 to the input of a frequency modulator 76. The two triodes 76a and 76b operate together to form a variable resistance dependent in magnitude upon the signal applied to the transformer 75. This resistance is connected in the frequency controlling R.-C. network of a conventional oscillator 77. The construction and operation of the modulator 76 and its oscillator 77 are well understood by those skilled in the art, one form of such a system being illustrated and described in the Proceedings of the Institute of Radio Engineers (1944), vol. 32, page 409.

The output of the oscillator 77 varied in accordance with variations in resistance of the modulator unit 76 is coupled to filter 35 by way of transformer 78. Thus, there is applied to the conductor 19, a signal having center frequency dependent upon the oscillator 77 and having variations about that center frequency controlled by the magnitude of the unbalance signal from the bridge 10. This unbalance signal is then transmitted uphole over cable 17 for measurement of the properties of the formations for producing the unbalance of the bridge 10.

The signal of frequency $F_1$ applied to the vertical diagonal of bridge 10 is also transmitted over cable conductor 19 as a frequency-modulated signal to provide a reference for the phase-detecting system located at the surface. More particularly, the output of the triode amplifier 71 is applied by way of a condenser 80 to the input of a modulator 81 of construction and operation identical to that of the modulator 76. Modulator 81 controls frequency of the output of the oscillator 82 which is coupled by way of transformer 83 to the filter network 54. The center frequency of oscillator 77 may differ substantially from that of oscillator 82 in order that there may be frequency discrimination between the two signals at the earth's surface. For example, the exciting signal $F_1$ may be 1000 cycles per second; the center frequency $F_2$ at 9 kilocycles; and the center frequency $F_3$ may be 13 kilocycles which will permit independent detection thereof.

The filter network 62 connected to the primary of a power supply transformer 85 provides a channel for power currents of frequency $F_4$. The rectifier network 86 connected to a secondary winding of the transformer 85 is conventional in design and operation and will not be described in detail. It is to be noted, however, that the negative terminal of the power supply 86 is connected to ground and that the terminal indicated by B+ is understood to be connected to points similarly identified in each of the associated circuits on Fig. 2. Thus, in the system of Fig. 2 there are two signals transmitted uphole over the conductor 19, the first one at frequency $F_2$ controlled by bridge unbalance, and the second one at frequency $F_3$ controlled by the magnitude of the voltage energizing the bridge network 10.

Figure 3A:
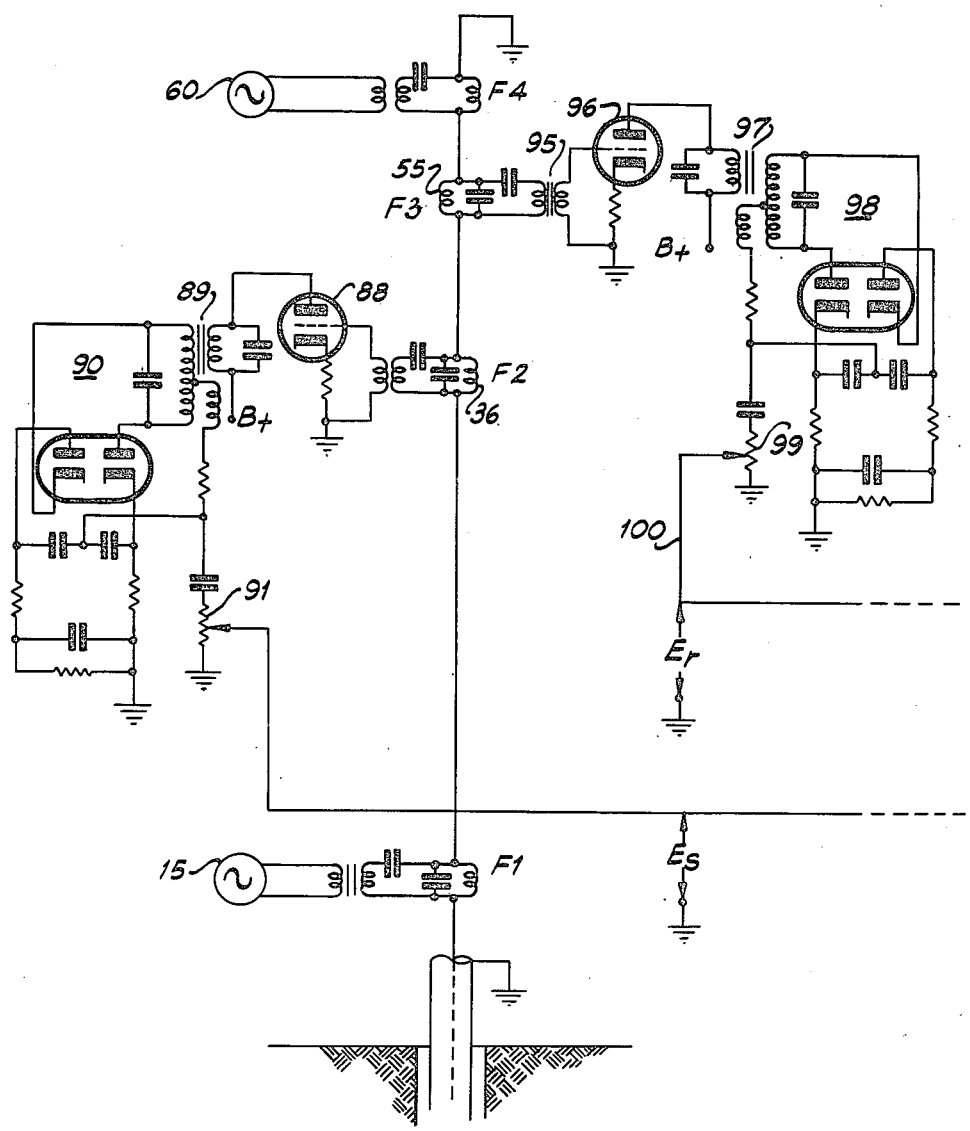
Fig. 3a is a schematic diagram of the surface-detecting system of Fig. 1.

Fig. 3a is illustrative of one type of detector system for converting the aforementioned signals at frequencies of $F_2$ and $F_3$ into signals of frequency $F_1$, whose magnitudes vary in accordance with the unbalance signal from the bridge 10 and the signal for exciting the bridge 10, respectively. More particularly, filter 36 presenting a high impedance to frequency $F_2$ and substantially no impedance to frequency $F_3$ couples the unbalance signal to a demodulating network which includes an ampifying triode 88 having a transformer 89 connected in the plate circuit thereof. The transformer 89 has one primary winding and two secondary windings and forms a part of a ratio detector 90. The signal output from the ratio detector 90 appearing across the resistor 91 has a frequency $F_2$ and varies in magnitude in direct proportion to the unbalance signal from the bridge 10. For details of the construction and operation of the ratio detector 90, reference may be had to receiving tube manuals such as the RCA Manual, Technical Series RC-15, 1947, Fig. 46, page 36, and also as incorporated in the FM tuner, page 218. Thus, the voltage $E_s$ appearing between conductor 92 and ground is the bridge unbalance signal.

Similarly, the reference voltage of frequency $F_3$ is transmitted through filter 55 to transformer 95 and amplifying triode 96, whose output is connected to the transformer 97. The transformer 97 forms a part of a second ratio detector 98, whose output appearing across the resistor 99 has a frequency $F_1$ and amplitude proportional to the amplitude of the reference signal applied to the vertical diagonal of the bridge 10. Thus, the voltage $E_r$ between the conductor 100 and the ground is the reference voltage for the phase-detecting network.

Figure 3B:
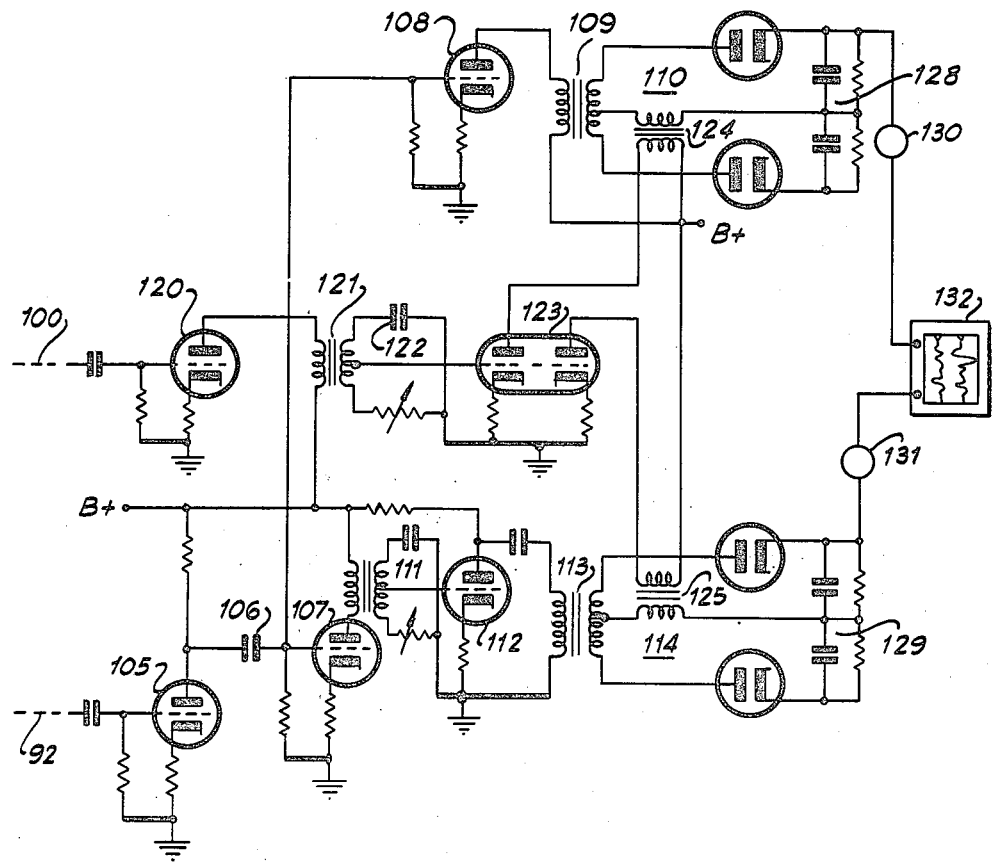
Fig. 3b is a schematic diagram of the phase-detecting network of Fig. 1.

Fig. 3b illustrates a system for separating the unbalance signal on conductor 92 into a first component proportional to the magnetic susceptibility of the formations and the second component proportional to the conductivity of the formations. Both the construction and operation of this system is illustrated and described in applicant's aforementioned patent application. Quite briefly, the unbalance signal appearing between conductor 92 and ground passes through a first amplifier or triode 105 whose output is applied by way of condenser 106 to the grids of two triodes 107 and 108. The output of triode 108 is coupled by way of transformer 109 to a phase-detecting network 110. The output of triode 107 is coupled by way of a phase-shifting network 111 to the control grid of a triode 112. The output of triode 112 is coupled by way of transformer 113 to the input of a second phase-detecting network 114.

The reference signal appearing on conductor 100 is applied to a triode 120. The output of triode 120 is coupled by way of transformer 121 to a phase-shifting network 122, the output of which is connected directly to the grids of the dual triode 123. The output of the first of the dual triodes is connected through transformer 124 to the phase-detector 110, and the output of the second stage of the dual triode 123 is coupled to the phase-detector 114 by way of transformer 125. The signal applied to the transformer 113 is shifted 90° in phase from the signal applied to the transformer 109 by the phase-shifting network 111. Thus, the signal appearing across the center tapped impedance network 128 of the detector 110 is proportional to the component of the unbalance signal that is in phase with the reference signal applied to the transformer 124. Similarly, the signal appearing across the center tapped impedance network 129 of the detector 114 is proportional to the quadrature component of the unbalance signal as compared with the reference signal applied to the transformer 125.

The signals from the center tapped impedance networks 128 and 129 may be measured by meters 130 and 131, respectively, or they may be applied to a chart recorder 132 to produce a permanent record of the variations in the unbalance signal from the bridge network 10. As is customary in the well logging art, the drive mechanism for the recorder 132 may be controlled by the cable 17 extending into the bore hole so that the length of the chart is proportional to the depth of the exploring solenoid 11 in the bore hole.

The filters connected to the conductor 19 of the cable 17 have been illustrated as LC tuned networks and are to be taken as representative of filter networks which in general present a high impedance for a selected frequency and very low impedance to frequencies displaced in the spectrum from the selected frequencies. The frequency of the power source 60 of Fig. 1 may be 60 cycles or 400 cycles, being a matter primarily of convenience and availability of power. The source 15 of frequency $F_1$ may be the aforementioned 1000 cycles or may differ materially as dictated by the desired design of the bridge network 10 and the operating characteristics thereof. The frequencies $F_2$ and $F_3$ as previously suggested are selected to be substantially displaced in the frequency spectrum so that they may be separated at the earth's surface by filtering circuits that are not unnecessarily complex.

While certain embodiments of the invention have been illustrated and described, it will be understood that further modifications will now suggest themselves to those skilled in the art. It is therefore intended to cover such modifications of the invention as fall within the scope of the appended claims.

What is claimed is:

1. In a well logging system for producing a signal at an exploring bridge network located in a well bore for application to phase detectors at the surface of the earth the combination therewith which comprises means extending between said bridge and said phase detectors including a cable adapted to extend to variable depths in a well bore for movably supporting said network in said well bore, a source of alternating current at the surface of the earth connected to said cable means for exciting said bridge network, frequency modulating means connected between the output terminals of said bridge network and said cable for applying to said cable a frequency modulated signal dependent upon the output of said bridge network, a second frequency modulating means connected between the input terminals of said bridge network and said cable for applying to said cable a second frequency modulated signal dependent upon the input to said bridge network, and means interconnecting said cable and said phase detectors for demodulating said signals to produce bridge input and bridge output signals at the surface of the earth that have phase relations independent of variations in the impedance of said cable as the depth of said bridge in said well bore is varied.

2. In a well logging system for producing at an exploring bridge network located in a well bore a signal for application to phase detectors at the surface of the earth the combination therewith which comprises means extending between said bridge and said phase detectors including a single conductor cable adapted to extend to variable depths in a well bore for movably supporting said network in said well bore, an oscillator having an output at a first frequency connected to input terminals of said bridge network, frequency modulating means having an output centered at a second frequency different than said first frequency connected between the output terminals of said bridge network and said cable for applying to said cable a signal which varies from said second frequency in dependence upon the output of said bridge network, a second frequency modulating means having an output centered at a third frequency different than the aforementioned frequencies connected between said input terminals and said cable for applying to said cable a signal which varies from said third frequency in dependence upon the input to said bridge network, and means interconnecting the terminals of said cable at the surface of the earth and said phase detectors for demodulating said signals to produce bridge input and bridge output signals that have phase relations independent of variations in the impedance of said cable as its length in said well bore is varied.

3. A well logging system comprising a cable extending from the surface of the earth into a well bore, a source of alternating current of a first frequency connected to said cable, a bridge network supported by said cable in said well bore and having its input terminals connected to said cable for excitation thereof by said alternating current to produce at the bridge network output terminals a signal dependent upon characteristics of the formations adjacent thereto, a frequency modulating network connected between said output terminals and said cable for applying to said cable a frequency modulated signal dependent upon said bridge output signal, a frequency modulating network connected between said input terminals of said bridge network and said cable for applying thereto a frequency modulated signal dependent upon the input signal to said bridge network, and demodulating means connected to terminals of said cable at said surface for producing bridge input signals and bridge output signals of said first frequency that are independent of variations in the impedance of said cable as the depth of said bridge network varies in said well bore.

4. In a well logging system for producing a signal at an exploring bridge located in a well bore for application to phase detectors at the surface of the earth, the combination therewith which comprises means extending between said bridge and said phase detectors including a cable adapted to extend to variable depths in a well bore for movably supporting said network in said well bore, a source of alternating current having an output circuit connected to the input terminals of said bridge network, frequency modulating means connected between the output terminals of said bridge network and said cable for applying to said cable a frequency modulated signal dependent upon the output of said bridge network, a second frequency modulating means connected between the input terminals of said bridge network and said cable for applying to said cable a second frequency modulated signal dependent upon the input to said bridge network, and means interconnecting said cable and said phase detectors for demodulating said signals to produce bridge input and bridge output signals at the surface of the earth that have phase relations independent of variations in the impedance of said cable as the depth of said bridge in said well bore is varied.

ROBERT A. BRODING.

REFERENCES CITED

The following references are of record in the file of this patent:

UNITED STATES PATENTS

| Number | Name | Date |
| --- | --- | --- |
| 2,535,006 | Broding | Dec. 26, 1950 |